United States Patent
Hirai et al.

(10) Patent No.: US 8,943,860 B2
(45) Date of Patent: Feb. 3, 2015

(54) VIBRATION CONTROL DEVICE FOR WASHING MACHINE

(75) Inventors: Masaaki Hirai, Tokyo (JP); Akiyuki Yokoyama, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 998 days.

(21) Appl. No.: 13/040,858

(22) Filed: Mar. 4, 2011

(65) Prior Publication Data

US 2011/0214455 A1    Sep. 8, 2011

(30) Foreign Application Priority Data

Mar. 8, 2010    (JP) .................................. 2010-051109

(51) Int. Cl.
- D06F 37/20    (2006.01)
- D06F 33/00    (2006.01)

(52) U.S. Cl.
CPC ...................................... D06F 33/00 (2013.01)
USPC .............................. 68/23.1; 68/12.06; 68/23.2

(58) Field of Classification Search
CPC ......... D06F 33/00; D06F 37/20; D06F 37/22; D06F 37/24; D06F 37/265; D06F 37/268; D06F 37/269; D06F 39/125; D06F 58/04; D06F 58/08; A61B 17/7032; A61B 17/7035; A61B 17/7023; F16M 11/14; F16M 11/2078; F16M 11/12; G06F 3/03549; B60G 7/005
USPC ...................... 68/23.1, 140, 25, 12.02, 12.06; 248/638, 605; 403/122, 90, 56, 76, 403/114, 141

See application file for complete search history.

(56) References Cited

U.S. PATENT DOCUMENTS 1,978,866 A * 10/1934 Konig ........................... 417/417
3,509,742 A *  5/1970 Bauer ........................... 68/23.1

FOREIGN PATENT DOCUMENTS

| JP | 11-179091   | 7/1999 |
| JP | 2008-502    | 1/2008 |
| TW | 200928041 A | 7/2009 |

OTHER PUBLICATIONS

English Machine Translation of Description of JPH11179091A (Masato et al. Jul. 1999).*
Taiwanese Office Action issued Aug. 20, 2013, in Taiwan Patent Application No. 100107595 (with English Translation).

* cited by examiner

*Primary Examiner* — Michael Barr
*Assistant Examiner* — Irina Graf
(74) *Attorney, Agent, or Firm* — Oblon, Spivak, McClelland, Maier & Neustadt, L.L.P.

(57) ABSTRACT

A vibration control device for a washing machine is composed of a drum to house laundry, a washing tank to house the drum which is suspended by a chassis of the washing machine, a drum driving motor, an acceleration detecting unit to detect an acceleration in the horizontal direction of the washing tank, a linear actuator fixed to the chassis of the washing machine to generate a driving force in the horizontal direction to the chassis of the washing machine, a force transmitting unit to connect a movable axis of the linear actuator with the washing tank, and a control unit to control the driving force of the linear actuator based on the acceleration detected by the acceleration detecting unit. The force transmitting unit transmits the driving force and absorbs mechanistically relative displacement in the back and forth direction and in the up and down direction.

4 Claims, 7 Drawing Sheets

VIBRATION CONTROL DEVICE FOR WASHING MACHINE

CROSS REFERENCE TO RELATED APPLICATION

This application is based upon and claims the benefit of priority from Japanese Patent Application No. 2010-051109, filed on Mar. 8, 2010, the entire contents of which are incorporated herein by reference.

FIELD

Embodiments described herein relate generally to a vibration control device to suppress vibration which is generated in a washing machine.

BACKGROUND

Generally, in a washing machine, laundry inside the washing tank often biases, and thereby imbalanced load is applied to the washing tank and causes the vibration of the washing tank. This vibration is an important problem which affects operational error of the washing machine. Particularly, while the rotational speed of a drum is increasing at the time of dehydration operation, lateral vibration of the washing tank is subject to become large when passing through the resonant frequency of the suspensions of the washing tank, and the washing tank contacts with the chassis and thereby generate error and make a cause to stop the dehydration operation.

In order to prevent the increase of the vibration at the resonant point, it is effective to add a large damper to the suspension of the washing tank. However, as the addition of the damper to the suspension has property to increase the vibration transmission in the frequency range higher than the resonant frequency, so, instead of the effect of suppressing the vibration of the washing tank at the resonant point, concurrently transmitting very large vibration to the washing machine chassis may occur, when the speed of the dehydration operation reaches a high speed. For the reason, it is not possible to add a damper which has enough large damping force to suppress the resonance vibration.

With respect to a problem like this, a washing machine is proposed in which vibration insulating mechanisms with active vibration control device are arranged at the lower face and the side face of the washing tank between the washing machine chassis and the washing tank, thereby to prevent the increase in the vibration of the washing tank and additionally to suppress the transmission of the vibration to the washing machine chassis side.

DETAILED DESCRIPTION

According to one embodiment, a vibration control device for a washing machine is composed of a drum to store laundry inside, a washing tank to house the drum which is suspended by a chassis of the washing machine with suspension, a driving motor to drive the drum, an acceleration detecting unit to detect an horizontal acceleration of the washing tank, a linear actuator fixed to the chassis of the washing machine, a force transmitting unit to connect a movable axis of the linear actuator with the washing tank, and a control unit to control a driving force of the linear actuator.

The linear actuator gives force in the horizontal direction to the washing machine chassis.

The force transmitting unit transmits the force in the horizontal direction which is generated by the linear actuator to the washing tank, though, absorbs mechanistically relative displacement in the back and forth direction and in the up and down direction.

The control unit controls the force of the linear actuator based on the acceleration in the horizontal direction which is detected by the acceleration detecting unit.

(First Embodiment)

Hereinafter, a first embodiment of the present invention will be described with reference to FIG. 1 to FIG. 4.

Figure 1:
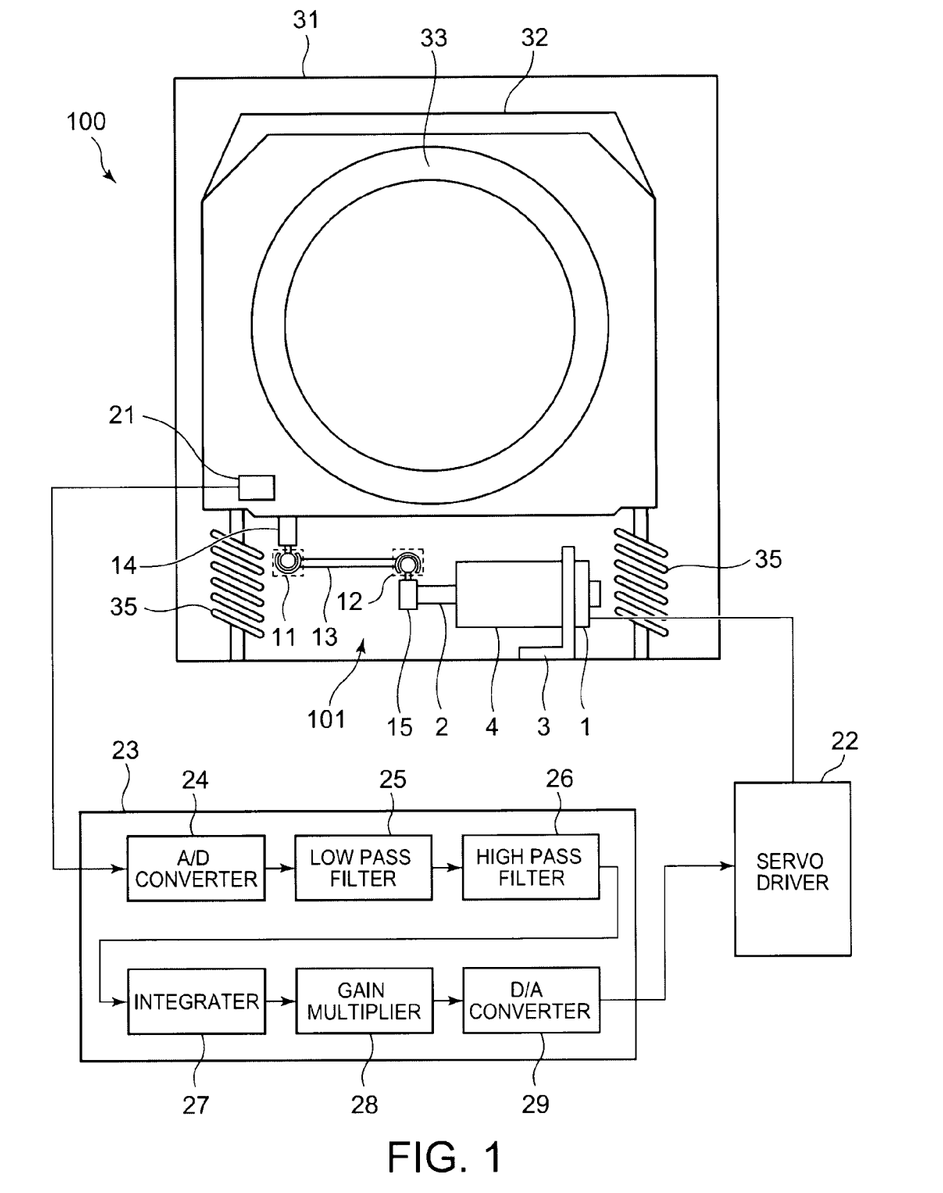
FIG. 1 is a schematic construction view of a drum type washing and drying machine seen from the back face according to a first embodiment of the present invention.
Figure 2:
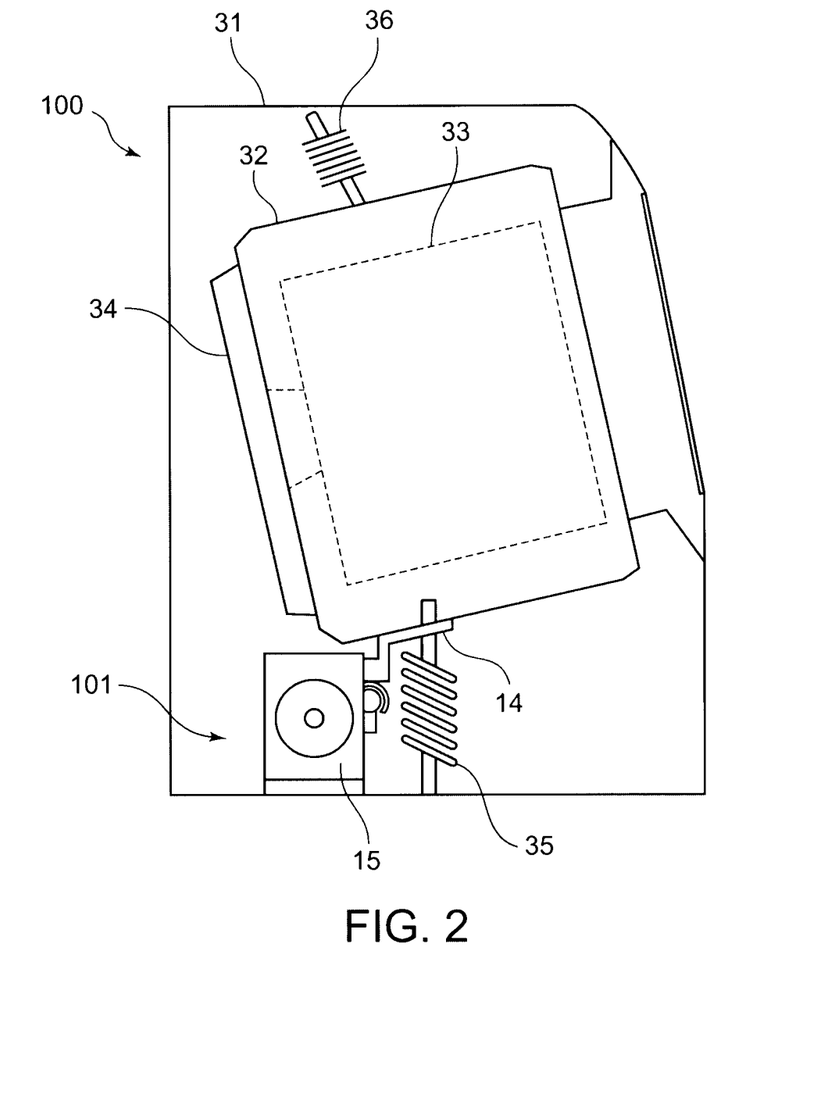
FIG. 2 is a schematic construction view of the drum type washing and drying machine seen from the side face according to the first embodiment of the present invention.

FIG. 1 is a schematic construction view of a drum type washing and drying machine 100 (hereinafter, referred to as a washing machine 100) which is seen from the back face. FIG. 2 is a schematic construction view of the washing machine 100 which is seen from the side face.

A washing machine chassis 31 forming an outer shell of the washing machine 100 has a laundry doorway which opens in a circular shape at the front face. The laundry doorway is opened and closed by a door. A cylindrical washing tank 32 having the bottom with the closed back face is arranged inside the washing machine chassis 31. A stator of a permanent magnet 34 as a motor for washing use is fixed by screw clamp to the central portion of the back face of the washing tank 32. The washing tank 32 is softly suspended to the washing machine chassis 31 by two lower suspensions 35 which are arranged at the lower portion of the washing tank 32 and an upper suspension 36 which is arranged at the upper portion of the washing tank 32. The washing tank 32 is connected to the washing machine chassis 31 by a horizontal direction vibration suppressing unit 101 which will be described later. In addition, an acceleration sensor 21 which detect an acceleration of the washing tank 32 is arranged at an arbitrary position of the washing tank 32.

A back end portion of an axis of rotation of the permanent magnetic motor 34 is fixed to a rotor of the permanent magnetic motor 34. A front end portion of the permanent magnet motor 34 protrudes into the washing tank 32. A cylindrical drum 33 having the bottom with the closed back face is fixed to the front end portion of the rotation axis so as to become coaxial to the washing tank 32. The drum 33 rotates integrally with the rotation axis by the drive of the permanent magnet motor 34. A plurality of circulation holes capable of circulating air and water, and a plurality of baffles so as to scrape and ravel out the laundry in the drum 33 are provided in the drum 33.

The horizontal vibration suppressing unit 101 is composed of a first spherical face link unit 11 fixed to the washing tank 32 side, a linear actuator 1 fixed to the washing machine chassis 31 side, a second spherical face link unit 12 fixed to a movable axis 2 side of the linear actuator 1, and a connecting member 13 connected between the first spherical face link unit 11 and the second spherical face link unit 12. The first spherical face link unit 11 is composed of an internal sphere fixed to the washing tank 32 side, and an outer housing to slide along the outer circumference of the internal sphere. One end of the connecting member 13 is fixed to the outer housing. The second spherical face link unit 12 has the same mechanism as that of the first spherical face link unit 11, and the other end of the connecting member 13 is fixed on the outer housing of the second spherical face link unit 12.

Figure 3:
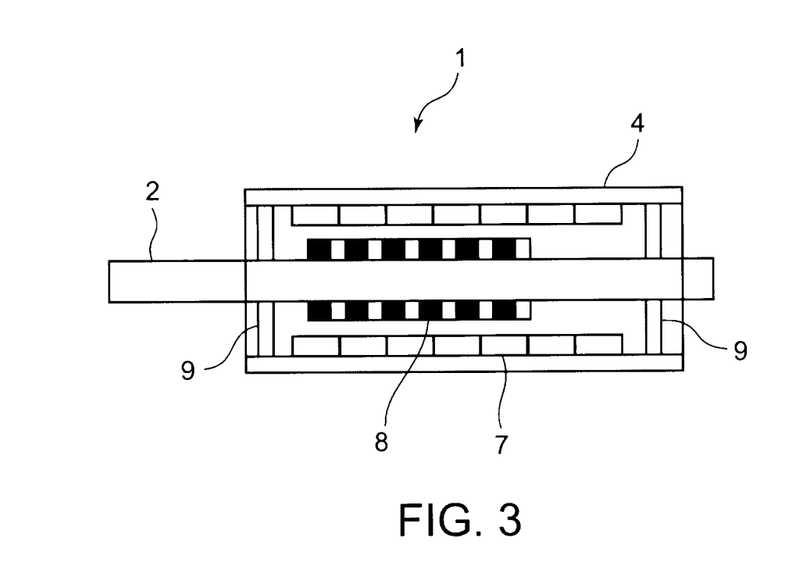
FIG. 3 is a schematic construction view showing a construction of a linear motor.

The linear actuator 1 is a linear motor 1, for example, and a linear motor chassis 4 is fixed to the washing machine chassis 31 via a bracket 3 for fixing. The linear motor 1 is installed in the horizontal direction, and a construction is used in which a movable axis 2 is movable to the horizontal direction. FIG. 3 is a view showing a construction of the linear motor 1. A stator coil 7 so as to generate AC magnetic field is installed in a cylindrical shape at the inside of the linear motor chassis 4 having a cylindrical cross section. The rod-shaped movable axis 2 around which permanent magnets 8 are arranged in rows is arranged at the central axis of the linear motor chassis 4. Slide bearing 9 so as to slidably support the movable axis 2 are arranged in the vicinity of the both ends of the linear motor chassis 4. The slide bearing 9 supports the movable axis 2 slidably.

The first spherical face link unit 11 links a washing tank side member 14 fixed to the washing tank 32 with the one end of the connecting member 13. The first spherical face link unit 11 is rotatable in the up and down direction by the above-described mechanism. The second spherical face link unit 12 links a movable axis side member 15 which is arranged at the tip of the movable axis 2 of the linear motor 1 with the other end of the connecting member 13. The second spherical face link unit 12 is also rotatable in the up and down direction by the above-described mechanism. The first spherical face link unit 11, the second spherical face link unit 12, and the connecting member 13 compose force transmitting unit to transmit generated force of the linear motor 1 to the washing tank 32. In addition, as the first spherical face link unit 11 just has to constitute a so-called universal joint, the outer housing may be fixed to the washing tank 32 side and the one end of the connecting member 13 may be fixed to the internal sphere. That is, one of the links of the first spherical face link unit 11 may be fixed to the washing tank 32 and the other end may be fixed to the one end of the connecting member 13. This may be applied to the second spherical face link unit 12 in the same way.

The linear motor 1 is connected to a servo driver 22 so as to drive the movable axis 2. The servo driver 22 is connected to a controller 23 of the vibration control device to output a force reference signal for the linear motor 1 in real time. The controller 23 of the vibration control device is connected to the above-described acceleration sensor 21. The controller 23 of the vibration control device performs a predetermined vibration control calculation based on the acceleration signal from the acceleration sensor 21, and outputs the force reference signal for the linear motor 1 to the servo driver 22 in real time. Receiving the signal from the controller 23 of the vibration control device, the servo driver 22 drives the movable axis 2 of the linear motor 1. In FIG. 1, the controller 23 of the vibration control device and the servo driver 22 are arranged outside the washing machine 100, but they may be installed inside the washing machine 100.

In the controller 23 of the vibration control device of FIG. 1, one example of algorithm of the vibration control is shown so as to make the linear motor 1 generate the driving force to reduce the vibration of the washing tank 32, based on the acceleration signal outputted from the acceleration sensor 21 installed in the washing tank 32. The acceleration signal is converted to the force reference signal for the linear motor 1 via an A/D converter 24, a low pass filter 25, a high pass filter 26, an integrator 27, a gain multiplier 28, and a D/A converter 29 in the controller 23 of the vibration control device. The force reference signal is outputted to the servo motor 22 for the linear motor 1. The linear motor 1 generates the force for horizontal vibration control of the washing tank 32 in real time.

Next, an operation of the present embodiment will be described.

At the time of operating the washing machine, when the washing tank 32 vibrates in the horizontal direction due to the imbalanced load of the laundry in the drum 33, the acceleration sensor 21 detects the vibration acceleration in real time, and outputs the acceleration signal to the A/D converter 24 of the controller 23 of the vibration control device. The A/D converter 24 converts the analog acceleration signal to the digital signal, and outputs the signal to the low pass filter 25. The low pass filter 25 removes high frequency noise components which adversely affect performance of the vibration control in the inputted acceleration signal, and outputs a filtered signal to the high pass filter 26. The high pass filter 26 removes DC components which adversely affect performance of the vibration control, and outputs a filtered signal to the integrator 27. A cutoff frequency of the high pass filter 26 can be set sufficiently lower than a frequency of the vibration of the washing tank 32. A clean acceleration signal from which components adversely affecting performance of the vibration control are removed can be obtained by these processings. The integrator 27 integrates the clean acceleration signal to convert into a vibration velocity signal in the horizontal direction of the washing tank 32, and outputs the vibration velocity signal to the gain multiplier 28. The gain multiplier 28 multiplies the vibration velocity signal by a predetermined gain, and outputs a multiplied signal to the D/A converter 29. The D/A converter 29 converts the inputted digital signal to the analog signal, and outputs signal to the servo driver 22 as the force reference signal.

The servo driver 22 controls current of the stator coil 7 of the linear motor 1 according to the force reference signal which is outputted from the controller 23 of the vibration control device, and thereby makes the movable axis 2 generate the driving force in the horizontal direction in accordance with the force reference signal. When the linear motor 1 generates the driving force, the movable axis 2 of the linear motor 1 is activated, and its force is applied to the washing tank 32 in the horizontal direction via the second spherical face link unit 12, the connecting member 13, and the first spherical face link unit 11.

Next, an operation and effect will be described which are caused by providing the first spherical face link unit 11, the connecting member 13, the second spherical face link unit 12.

Figure 4A:
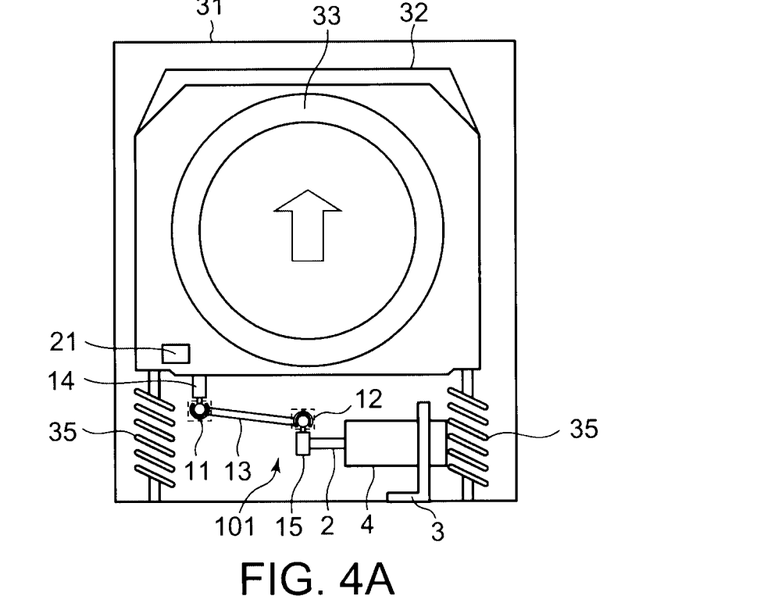
FIG. 4 is a schematic construction view showing a vibration control operation of the drum type washing and drying machine according to the first embodiment of the present invention.
Figure 4B:
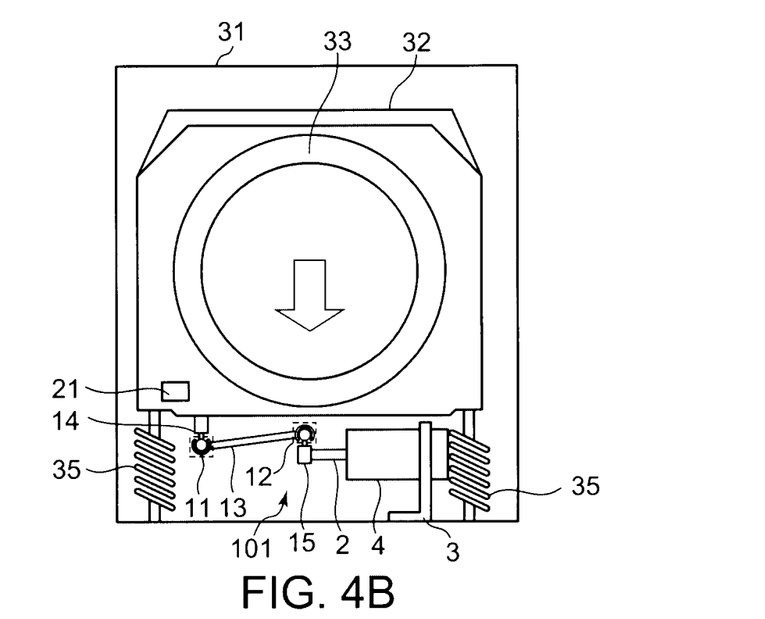

The washing tank has many vibration modes besides the vibration mode of horizontal direction, such as the up and down direction vibration mode, rotating vibration mode around the gravity center of the tank, back and forth direction vibration mode, etc. Here, the horizontal direction means a lateral direction on the plane of paper in FIG. 1, and the back and forth direction means a vertical direction toward the plane of the paper. FIGS. 4A, 4B show movement of the first spherical face link unit 11, the connecting member 13, and the second spherical face link unit 12 in case that a mode that the washing tank 32 vibrates in the up and down direction is generated. As shown in FIG. 4A, if the washing tank 32 is displaced in the upper direction by the vibration, the first spherical face link unit 11 which is fixed to the washing tank 32 side moves in the upper direction in the same manner as the washing tank 32. On the other hand, as the second spherical face link unit 12 which is fixed to movable axis 2 side of the linear motor 1 is fixed to the linear motor 1, its height is constant always. For the reason, displacement is generated in the relative height between the first spherical face link unit 11 and the second spherical face link unit 12, but as the two spherical face link units are each rotatable in the up and down direction, the respective link units turn by definite amounts thereby to absorb the displacement mechanistically in the height between the washing tank 32 and the linear motor 1. Similarly, as shown in FIG. 4B, even if the washing tank 32 is displaced in the lower direction by the vibration, as the two spherical face link units are each movable in the up and down direction, the respective link units turn by definite amounts to thereby absorb mechanistically the displacement in the relative height between the washing tank 32 and the linear motor 1. Accordingly, even if the washing tank 32 vibrates in the up and down direction, it can be prevented that the lateral vibration deflection of the tank is transmitted to the linear motor 1 side. In addition, the washing tank 32 is not made to vibrate in the up and down direction by the force from the linear motor 1.

If seen in detail, when the heights of the first spherical face link unit 11 and the second spherical face link unit 12 become different by the lateral vibration of the tank, and the connecting member 13 which connect both the link units inclines to the horizon plane, then not only the relative distance in the up and down direction, but also the relative distance in the horizontal direction changes, and thereby a little partial force component is generated not only for lateral direction, but also in the horizontal direction. Though the amount of the horizontal displacement of the washing tank 32 is sufficiently small compared with the lateral distance between the first spherical face link unit 11 and the second spherical face link unit 12, practically this amount can be virtually ignored. In addition, in the case that the circumstances arise in which the lateral relative distance of the two link is so large that this effect can not be ignored, this effect can be reduced by setting the distance between the first spherical face link unit 11 and the second spherical face link unit 12 as long as possible.

According to the present embodiment, with respect to the vibration of the washing tank 32 in the horizontal direction, as the vibration of the washing tank 32 is directly transmitted to the linear motor 1, the vibration can be controlled by the driving force of the linear motor 1. On the other hand, in case that the washing tank 32 vibrates in the up and down direction or in the back and forth direction except in the horizontal direction, the displacement by the vibration is not directly transmitted to the linear motor 1 because of providing the first spherical face link unit 11, the connecting member 13 and the second spherical face link unit 12. With respect to the up and down vibration and the back and forth vibration of the washing tank 32, the displacement can be absorbed by the movement of the respective spherical face link units. On the other hand, with respect to the horizontal vibration, the spherical link units do not operate, and the movable axis 2 of the linear motor 1 and the washing tank 32 become equal to the state in which they are directly connected, and thereby it is possible to give the driving force of the linear motor 1 to the washing tank 32 without loss.

In addition, in case that the above-described control method is used, when the washing tank 32 generates horizontal vibration, a vibration control force proportional to the horizontal vibration is to be applied to the washing tank 32. At the resonance frequency of the washing tank 32 in the horizontal direction in particular, this control can suppress the increase in vibration of the washing tank 32 to a large extent, and can exercise a high vibration reduction effect. Also at the frequency higher than the resonance frequency, with this active vibration control algorithm, the vibration can be suppressed. In case that a hydraulic damper and so on which force is not controlled are provided, the vibration is to be transmitted to the chassis in the high speed operation, but in the present embodiment, the vibration is not made to be increased at frequencies except the resonance frequency by performing the above-described control.

(Second Embodiment)

Figure 5:
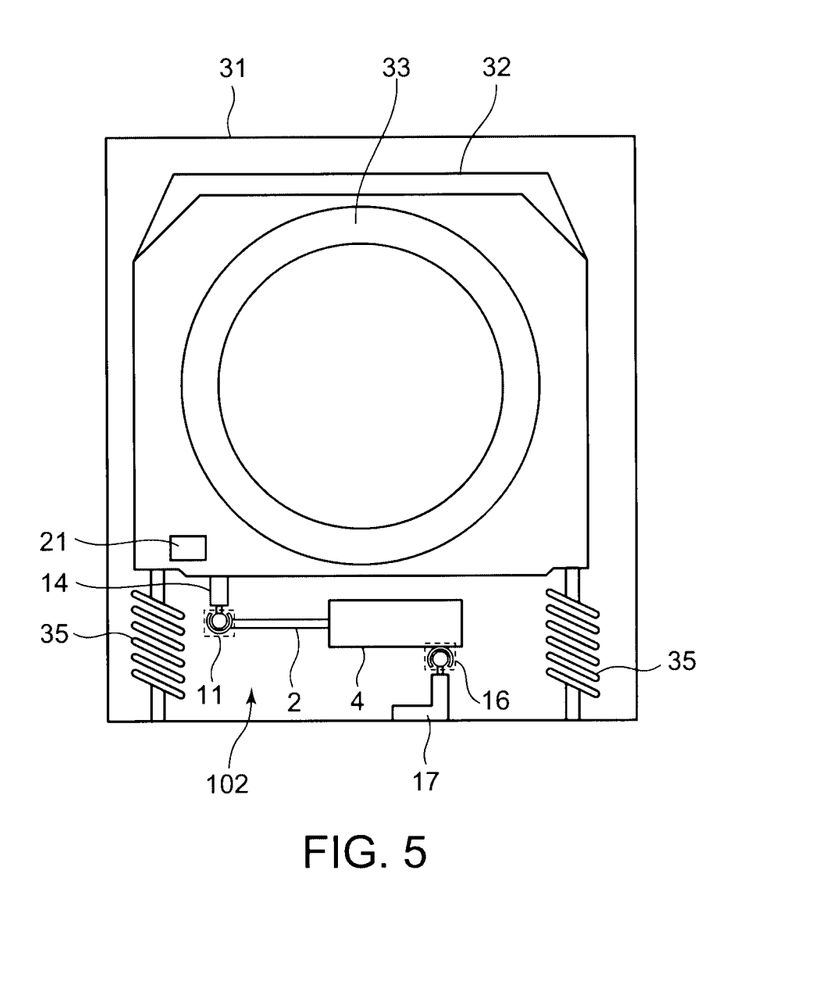
FIG. 5 is a schematic construction view of a drum type washing and drying machine seen from the back face according to a second embodiment of the present invention.

A second embodiment of the present invention will be described with reference to FIG. 5. The description of the same portions as described in the above-described first embodiment will be omitted, and only different portions will be described.

A horizontal vibration suppressing unit 102 is composed of the first spherical face link unit 11 fixed to the washing tank 32 side, a third spherical face link unit 16 fixed to the washing machine chassis 31 side, and the linear motor 1 installed between the first spherical face link unit 11 and the third spherical face link unit 16. The third spherical face link unit 16 is composed of an internal sphere fixed to the washing machine chassis 31 side, and an outer housing to slide along the outer circumference of the internal sphere. The lower portion of the linear motor chassis 4 is fixed to the outer housing.

The first spherical face link unit 11 links the washing tank side member 14 fixed to the washing tank 32 with the tip of the movable axis 2 of the linear motor 1. The first spherical face link unit 11 is rotatable in the up and down direction. The third spherical link unit 16 links a washing machine chassis side member 17 which is fixed to the washing machine chassis 31 with the linear motor chassis 4. The third spherical face link unit 16 is rotatable in the up and down direction by the above-described mechanism. The first spherical face link unit 11 and the third spherical face link unit 16 compose force transmitting unit for transmitting the driving force of the linear motor 1 to the washing tank 32. A construction may be used in which the internal sphere of the third spherical face link unit 16 is fixed to the lower portion of the linear motor chassis 4 in the same way as in the first embodiment.

An operation of the present embodiment will be described below.

At the time of operating the washing machine, when the washing tank 32 is displaced in the up and down direction, the first spherical face link unit 11 which is fixed to the washing tank 32 side is displaced in the up and down direction in accordance with the movement of the washing tank 32. On the other hand, the third spherical face link unit 16 which is fixed to the washing machine chassis 31 is not displaced in the up and down direction. For the reason, displacement is generated in the relative height between the first spherical face link unit 11 and the third spherical face link unit 16, but as the two spherical face link units are each movable in the up and down direction, each of the link units turns by a definite amount, and thereby absorb mechanistically the displacement.

According to the present embodiment, with respect to the vibration of the washing tank 32 in the horizontal direction, as the vibration of the washing tank 32 is directly transmitted to the linear motor 1, the vibration can be controlled by the driving force of the linear motor 1. On the other hand, in case that the washing tank 32 vibrates in the up and down direction or in the back and forth direction except in the horizontal direction, the displacement by the vibration is not directly transmitted to the linear motor 1 because of providing the first spherical face link unit 11 and the third spherical face link unit 16. With respect to the up and down vibration and the back and forth vibration of the washing tank 32, the displacement can be absorbed by the rotations of the respective spherical face link units, and with respect to the horizontal vibration, the spherical link units do not operate, and the movable axis 2 of the linear motor 1 and the washing tank 32 become equal to the state in which they are directly connected, and thereby it is possible to give the driving force of the linear motor 1 to the washing tank 32 without loss.

In the present embodiment, as the linear motor 1 hold concurrently the connecting member 13 of the first embodiment, it become unnecessary to provide the connecting member 13, and thereby the vibration control device can be installed in a small installation space.

(Third Embodiment)

A third embodiment of the present invention will be described with reference to FIG. 6. The description of the same portions as described in the above-described first embodiment will be omitted, and only different portions will be described.

Figure 6:
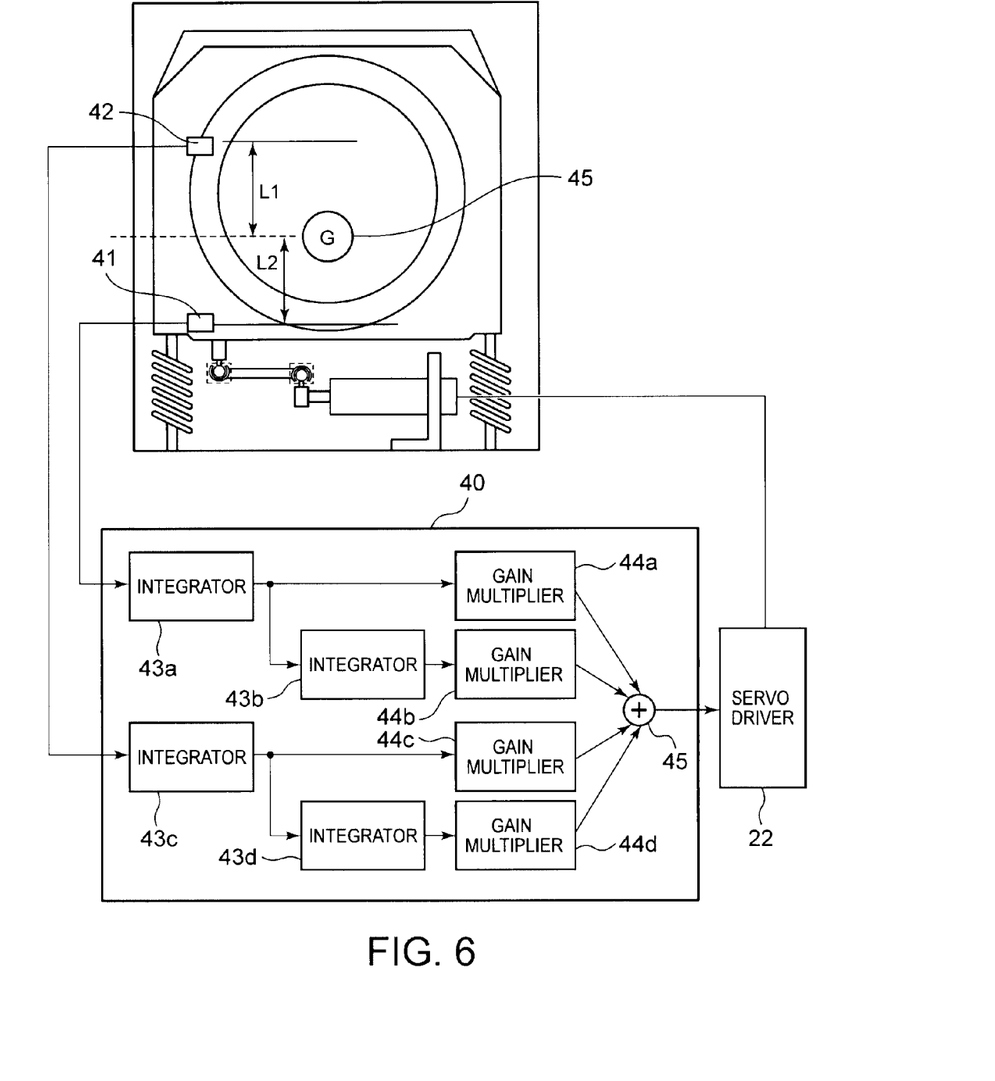
FIG. 6 is a schematic construction view of a drum type washing and drying machine seen from the back face according to a third embodiment of the present invention.

FIG. 6 shows a construction view of this embodiment. A controller 40 of the vibration control device indicates algorithm of the vibration control. With respect to the A/D converter 24, the low pass filter 25, the high pass filter 26, the D/A converter 29 which are described in the first embodiment, their description will be omitted. A first acceleration sensor 41 to measure an acceleration in the horizontal direction in the vicinity of the lower portion of the washing tank 32, and a second acceleration sensor 42 to measure an acceleration in the horizontal direction in the vicinity of the upper portion of the washing tank 32 are installed to the washing tank 32 in the present embodiment. An acceleration signal from the first acceleration sensor 41 and an acceleration signal from the second acceleration sensor 42 are inputted to the controller 40 of the vibration control device.

A first integrator 43a in the controller 40 of the vibration control device integrates the acceleration signal from the first acceleration sensor 41 to convert into a velocity signal, and outputs the velocity signal to a first gain multiplier 44a and a second integrator 43b. The first gain multiplier 44a multiplies the velocity signal by a predetermined gain and outputs a multiplied velocity signal to an adder 45. The second integrator 43b integrates the velocity signal to convert into a displacement signal, and outputs the displacement signal to a second gain multiplier 44b. The second gain multiplier 44b multiplies the displacement signal by a predetermined gain and outputs a multiplied displacement signal to the adder 45.

A third integrator 43c in the controller 40 of the vibration control device integrates the acceleration signal from the second acceleration sensor 42 to convert into a velocity signal, and outputs the velocity signal to a third gain multiplier 44c and a fourth integrator 43d. The third gain multiplier 44c multiplies the velocity signal by a predetermined gain and outputs a multiplied velocity signal to the adder 45. The fourth integrator 43d integrates the velocity signal to convert into a displacement signal, and outputs the displacement signal to a fourth gain multiplier 44d. The fourth gain multiplier 44d multiplies the displacement signal by a predetermined gain and outputs a multiplied displacement signal to the adder 45.

Here, gains which are designed properly based on the numerical model of vibration property of the washing tank 32 are used as respective gains of the gain multipliers 44a, 44b, 44c, 44d.

The adder 45 calculates the sum of the above-described four signals and outputs the sum to the servo driver 22 as the force reference signal.

The servo driver 22 controls current of the stator coil 7 of the linear motor 1 according to the force reference signal which is outputted from the controller 40 of the vibration control device, to make the movable axis 2 generate the driving force in the horizontal direction in accordance with the force reference signal. When the linear motor 1 generates the driving force, the movable axis 2 of the linear motor 1 is activated, and its force is applied to the washing tank 32 in the horizontal direction via the second spherical face link unit 12, the connecting member 13, and the first spherical face link unit 11.

An operation of the present embodiment will be described. In order to show an example, an effect will be described in case that, gains of the first gain multiplier 44a and the third gain multiplier 44c are each set to 0.5 and gains of the second gain multiplier 44b and the fourth gain multiplier 44d are each set to 0, and a distance L1 from the first acceleration sensor 41 to the center of gravity 45 of the washing tank 32 is equal to a distance L2 from the second acceleration sensor 42 to the center of gravity 45 of the washing tank 32.

In this state, in case that the rotation vibration around the center of gravity 45 of the washing tank 32 is absent, and vibration is present only in the horizontal direction, the acceleration signal from the first acceleration sensor 41 is equal to the acceleration signal from the second acceleration sensor 42, and a signal which is obtained by integrating both the acceleration signals, multiplying by the gain of 0.5 and adding becomes equal to the signal in the first embodiment where one sensor is provided, and the effect also becomes completely equivalent.

On the other hand, in case that the washing tank 32 does not vibrate in the horizontal direction and only rotation vibration around the center of gravity 45 is present, the acceleration signal from the first acceleration sensor 41 at the lower portion of the washing tank 32 and the acceleration signal from the second acceleration sensor 42 at the upper portion of the washing tank 32 have the same magnitude and reverse direction. In this time, a signal which is obtained by integrating both the signals, multiplying by the gain of 0.5 and adding becomes 0 as a result of being neutralized each other, and thereby the vibration control force becomes 0.

Accordingly, when the control of the present embodiment is performed, only the horizontal vibration component of the washing tank 32 is extracted and a vibration control force for the horizontal vibration component can be generated, and with respect to the rotation vibration around the center of gravity of the washing tank 32, an unnecessary vibration control force is not generated.

In case that the driving force from the linear motor 1 has to be applied to the lower portion of the washing tank 32 from the restrictions of the installation space, the rotation vibration of the washing tank 32 might be excited by the driving force. In this case, the effect can be mitigated by performing the control of the present embodiment, and the stable vibration control of the vibration of the washing tank 32 in the horizontal direction can be realized.

(Fourth Embodiment)

A fourth embodiment of the present invention will be described with reference to FIG. 7.

Figure 7A:
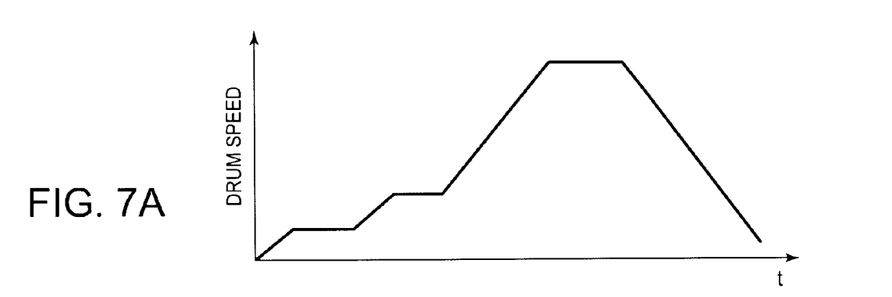
FIG. 7 is a view showing vibration amounts of a drum type washing and drying machine according to a fourth embodiment of the present invention.
Figure 7B:
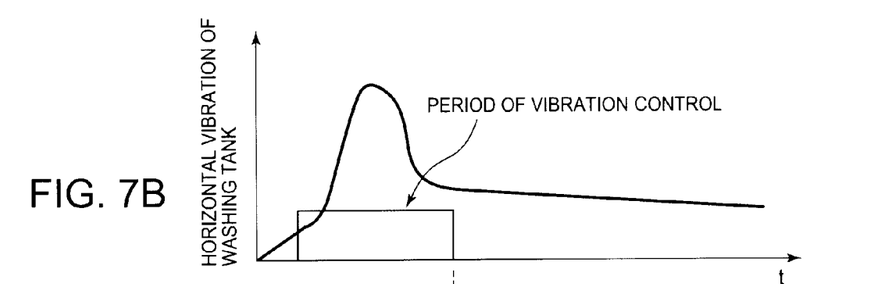
Figure 7C:
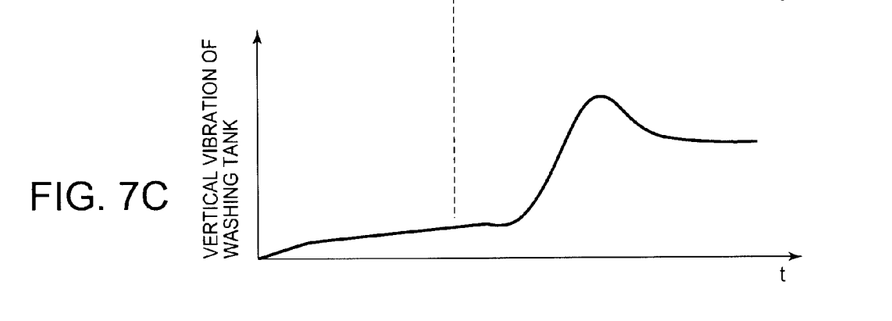

FIG. 7A shows time chart of the rotation speed of the drum 33 in the dehydration operation, and FIG. 7B shows time chart of the horizontal vibration amount of the washing tank 32. FIG. 7C shows time chart of the up and down vibration amount of the washing tank 32. As shown in FIG. 7A, an operation pattern from start to stop of dehydration operation changes depending on the state of the laundry inside the washing tank 32. The rotational speed increases in stages, and after performing high speed dehydration at a maximum speed for a predetermined time, the dehydration operation is finished.

As shown in FIG. 7B, at the region from low to medium area of the rotational speed, the vibration in the horizontal direction increases, because the rotational speed is close to that corresponding to the resonance frequency in the horizontal direction. On the other hand, as shown in FIG. 7C, when the rotational speed exceeds this speed region, the vibration in the up and down direction increases, because the rotational speed passes through that corresponding to the resonance frequency in the up and down direction of the washing tank 32.

In the present embodiment, means to detect the rotational speed of the drum 33 is provided, and according to the rotational speed, the vibration control is performed only at the region from low to medium speed which is a region of a predetermined rotational speed including the rotational speed corresponding to the resonance frequency in the horizontal vibration of the drum 33, and control of the vibration control is stopped at the higher rotational speed where the up and down vibration is dominant.

Consequently, at the region where the horizontal vibration is large, the horizontal vibration can be reduced to a large extent by performing the vibration control of the above-described embodiment. And at the region which exceeds the resonance frequency of the horizontal vibration, the power consumption of the vibration control device can be reduced by stopping the vibration control.

While certain embodiments according to the present invention have been described, these embodiments may be combined, and in addition, without being limited to the construction shown in each of the embodiments, construction materials and arrangements may be changed in each embodiment within the range without departing from the spirit of the construction in which the effect of the present invention can be obtained.

A position of the fixing unit to fix the first spherical face link unit 11 to the washing tank 32 may be made a position of the center of gravity. With this construction, it can be prevented that the driving force from the linear motor for vibration control becomes a rotation operation around the center of gravity, and the stability of control of the vibration control in the horizontal direction is increasing.

In addition, each of the link units may be rotatable not only in the up and down direction, but may be rotatable in the various directions, such as in the back and forth direction, and thereby the above-described effect can be obtained.

In the above-described embodiments, the drum type washing and drying machine 33 is quoted as an example, but if the embodiment is applied to the vertical washing machine, the effect will be obtained as well.

The invention claimed is:

1. A vibration control device for a washing machine, comprising:
   a drum configured to store laundry inside;
   a washing tank to house the drum, the washing tank being attached to a chassis of the washing machine by a suspension;
   a driving motor to drive the drum;
   an acceleration detecting unit to detect an acceleration in the horizontal direction of the washing tank;
   a linear actuator fixed to the chassis of the washing machine to generate a force in the horizontal direction;
   a force transmitting unit to connect a movable axis of the linear actuator with the washing tank, to transmit the force generated by the linear actuator in the horizontal direction to the washing tank, and to mechanically absorb a displacement of the drum in the back and forth direction and in the up and down direction relative to the tank; and
   a control unit to control the force of the linear actuator based on the acceleration in the horizontal direction detected by the acceleration detecting unit, wherein:
   the force transmitting unit has a first spherical face link unit with one end fixed to move with the washing tank, a second spherical face link unit with one end fixed to move with the movable axis of the linear actuator, and a connecting member cooperating with the other ends of the first spherical face link unit and the second spherical face link unit to connect together both the first and second spherical face link units,
   the first spherical face link unit and the second spherical face link unit are constructed to permit the connecting member to rotate in the up and down direction, and
   the first spherical face link unit and the second spherical face link unit are constructed to permit the connecting member to rotate in the back and forth direction.

2. The vibration control device for a washing machine according to claim 1, wherein:
   the acceleration detecting unit has a first acceleration sensor arranged at a portion below a position of the center of gravity of the washing tank, and a second acceleration sensor arranged at a portion above the position of the center of gravity; and
   the control unit outputs a sum of vibration velocities multiplied by gains and vibration displacements multiplied by gains as a force reference signal for the linear actuator, where the vibration velocities are obtained by integrating sensor signals of the first acceleration sensor and the second acceleration sensor, and the vibration displacements are obtained by integrating the vibration velocities.

3. The vibration control device for a washing machine according to claim 1, further comprising:
   a unit to detect the rotational speed of the drum;
   wherein the control unit performs vibration control only at a range of a predetermined rotational speed including the rotational speed corresponding to a resonance point of the horizontal vibration of the drum.

4. The vibration control device for a washing machine according to claim 2, further comprising:
   a unit to detect the rotational speed of the drum;
   wherein the control unit performs vibration control only at a range of a predetermined rotational speed including the rotational speed corresponding to a resonance point of the horizontal vibration of the drum.

* * * * *